US012605786B2

(12) United States Patent
Schneider et al.

(10) Patent No.: US 12,605,786 B2
(45) Date of Patent: Apr. 21, 2026

(54) SYSTEMS AND METHODS TO CONFIGURE A ROBOTIC WELDING SYSTEM

(71) Applicant: Illinois Tool Works Inc., Glenview, IL (US)

(72) Inventors: Joseph C. Schneider, Greenville, WI (US); Steven B. Massey, Jr., Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1027 days.

(21) Appl. No.: 17/710,427

(22) Filed: Mar. 31, 2022

(65) Prior Publication Data

US 2022/0314355 A1     Oct. 6, 2022

Related U.S. Application Data

(60) Provisional application No. 63/168,847, filed on Mar. 31, 2021.

(51) Int. Cl.
| | |
|---|---|
| *B23K 9/10* | (2006.01) |
| *B23K 9/095* | (2006.01) |
| *B25J 9/16* | (2006.01) |
| *B25J 13/00* | (2006.01) |

(52) U.S. Cl.
CPC .......... *B23K 9/1062* (2013.01); *B23K 9/0953* (2013.01); *B23K 9/1087* (2013.01); *B25J 9/161* (2013.01); *B25J 13/006* (2013.01)

(58) Field of Classification Search
CPC .. B23K 9/1062; B23K 9/0953; B23K 9/1087; B25J 9/161; B25J 13/006
See application file for complete search history.

(56) References Cited

U.S. PATENT DOCUMENTS

| | | | |
|---|---|---|---|
| 6,627,849 B2 | 9/2003 | Ihde et al. | |
| 8,957,344 B2 | 2/2015 | Rappl et al. | |
| 10,464,156 B2 * | 11/2019 | Denis ................... | B23K 9/1087 |
| 11,440,120 B2 * | 9/2022 | Denis ................... | H04W 12/50 |
| 2002/0166850 A1 * | 11/2002 | Ihde ...................... | B23K 9/1056 |
| | | | 901/42 |
| 2005/0152294 A1 * | 7/2005 | Yu ...................... | H04M 1/72412 |
| | | | 370/310 |
| 2011/0180517 A1 * | 7/2011 | Schneider ............ | B23K 9/1006 |
| | | | 219/108 |
| 2012/0265996 A1 * | 10/2012 | Kaal ................... | H04W 12/082 |
| | | | 713/182 |
| 2013/0091567 A1 * | 4/2013 | Finch .................. | H04L 12/2816 |
| | | | 726/22 |

(Continued)

*Primary Examiner* — Brian W Jennison

(74) *Attorney, Agent, or Firm* — McAndrews, Held & Malloy, Ltd.

(57) ABSTRACT

An example welding-type power supply includes: power conversion circuitry configured to convert input power to welding-type output power; auxiliary power output circuitry configured to output auxiliary power via an auxiliary power connection; communications circuitry configured to communicate via the auxiliary power connection; and processor(s) configured to: detect, via the communications circuitry, that a robot control system is coupled to the auxiliary power connection; and in response to detecting the robot control system, configuring the welding-type power supply based on receiving a communication from the robot control system via the communications circuitry.

20 Claims, 11 Drawing Sheets

(56)                 References Cited

U.S. PATENT DOCUMENTS

| | | | |
|---|---|---|---|
| 2013/0319988 A1* | 12/2013 | Beistle | B23K 9/32 |
| | | | 219/136 |
| 2014/0048522 A1* | 2/2014 | Dina | B23K 9/0953 |
| | | | 219/132 |
| 2015/0273610 A1* | 10/2015 | Denis | B23K 9/1087 |
| | | | 219/132 |
| 2019/0039161 A1* | 2/2019 | One | B23K 9/10 |
| 2020/0061733 A1* | 2/2020 | Denis | H04W 12/50 |
| 2021/0268595 A1* | 9/2021 | Ihde | B23K 9/1062 |

* cited by examiner

SYSTEMS AND METHODS TO CONFIGURE A ROBOTIC WELDING SYSTEM

RELATED APPLICATIONS

The present application claims the benefit of U.S. Provisional Patent Application Ser. No. 63/168,847, filed Mar. 31, 2021, entitled "SYSTEMS AND METHODS TO CONFIGURE A ROBOTIC WELDING SYSTEM." The entirety of U.S. Provisional Patent Application Ser. No. 63/168,847 is expressly incorporated herein by reference.

BACKGROUND

This disclosure relates generally to robotic welding and, more particularly, to systems and methods to configure a robotic welding system.

Robotic welding is often used to perform repetitive welding operations involving workpieces having a consistent configuration and series of welds to be performed. However, programming robots to perform the welding can be a difficult, tedious, and error-prone task.

SUMMARY

Systems and methods to configure a robotic welding system are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
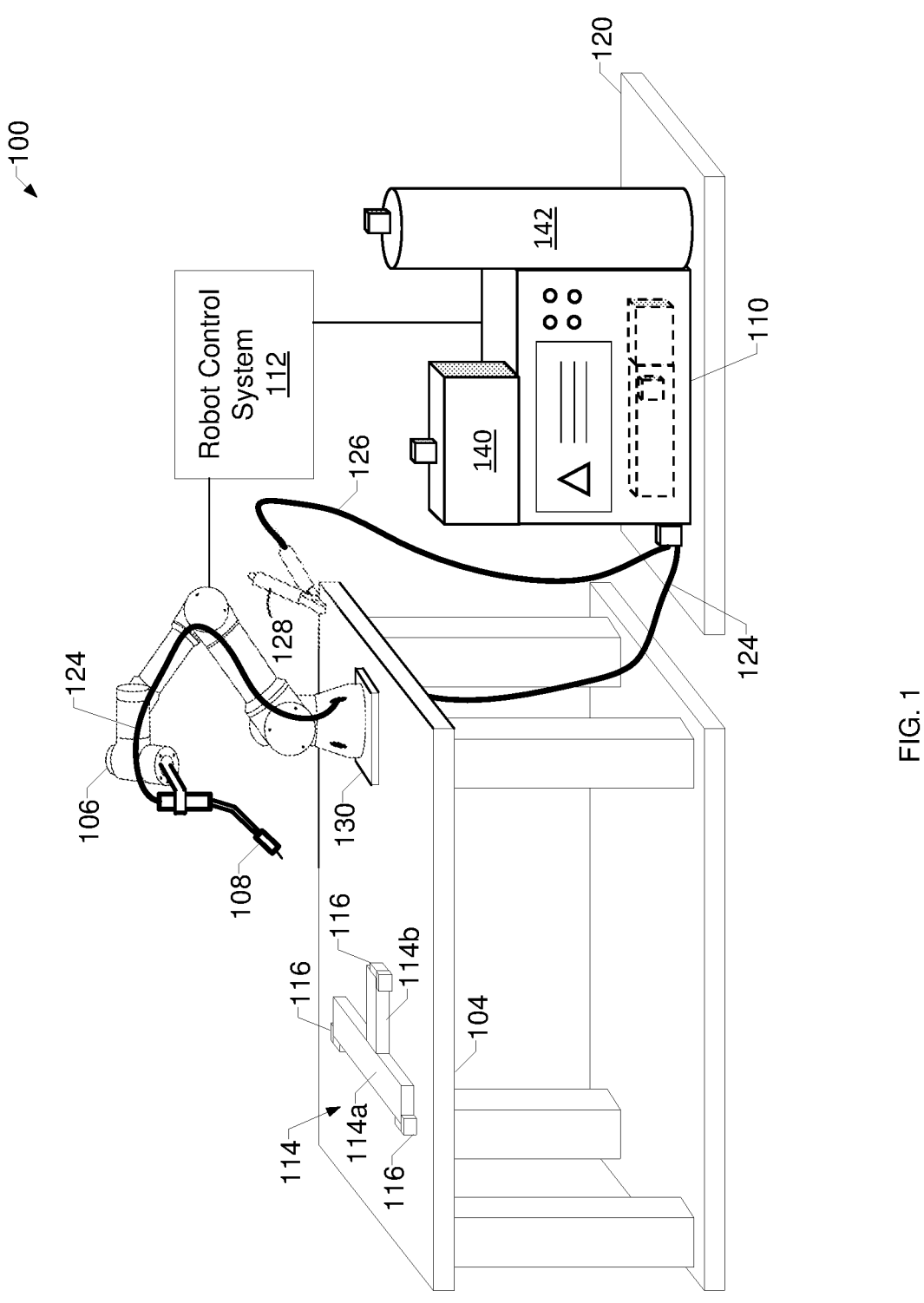
FIG. 1 illustrates an example robotic welding system to perform welding, including a welding-type power supply and a robot control system, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

Conventional robotic welding systems are labor-intensive to configure and program for a given welding operation. Configuration may involve connecting the welding equipment to the robot equipment and configuring the robot controller to interface with the welding equipment. Conventional configuration may involve manually specifying (e.g., via a user interface) the capabilities of the welding equipment prior to programming the robot controller to utilize such capabilities of the welding equipment during a welding operation. In some cases, an integrator performs the configuration for a customer who will program the equipment. However, the welding equipment may then be effectively locked to a robot due to a lack of knowledge to reconfigure a robot system with different welding equipment.

Disclosed example systems and methods improve the ease of configuring a robotic welding system by automatically pairing welding equipment with a robotic welding system, and transferring information between the welding equipment and the robot controller to facilitate control of the welding equipment by the robot controller. Disclose example systems and methods also improve the flexibility of robotic welding systems by enabling robotic welding system operators to quickly reconfigure robotic welding systems to use different welding equipment to perform different welding operations, without causing significant losses in productivity due to reconfiguration. For example, in a fabrication shop that has multiple robotic systems, the welding equipment may be easily moved from one robotic welder to another robotic welder in another part of the shop, and the robotic welding system can be quickly configured by pairing the welding equipment with the robot controller. As a result, the robotic welding systems can be quickly reconfigured and reprogrammed to perform the next welding job.

In some disclosed systems and methods, upon pairing of the welding equipment to the robot controller, the welding equipment may automatically transfer information such as: an identifier of a paired welding-type power supply, an identification of capabilities of a paired welding-type power supply, software instructions to facilitate control of the welding-type power supply by the robot control system, identification of a welding capability of the welding-type power supply, identification of an adjustable parameter of the welding-type power supply, identification of a parameter limitation of the welding-type power supply, a robotic welding procedure and/or welding-type parameters to perform the robotic welding procedure, and/or any other information that may be transferred between the welding equipment and the robot controller. In some examples, the welding equipment (e.g., a welding-type power supply) may store robotic welding procedures programmed and/or performed on a first robotic welding system for later recall and/or transfer to other robotic welding systems.

As used herein, the word "exemplary" means "serving as an example, instance, or illustration." The examples described herein are not limiting, but rather are exemplary only. It should be understood that the described examples are not necessarily to be construed as preferred or advantageous over other examples. Moreover, the terms "examples of the invention," "examples," or "invention" do not require that all examples of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

Disclosed example welding-type power supplies include: power conversion circuitry configured to convert input power to welding-type output power; auxiliary power output circuitry configured to output auxiliary power via an auxiliary power connection; communications circuitry configured to communicate via the auxiliary power connection; and processor(s) configured to: detect, via the communications circuitry, that a robot control system is coupled to the auxiliary power connection; and in response to detecting the robot control system, configuring the welding-type power supply based on receiving a communication from the robot control system via the communications circuitry.

In some example welding-type power supplies, the processor is configured to, in response to detecting the robot control system, transmit an identification of capabilities of the welding-type power supply via the auxiliary power connection. In some examples, the processor is configured to, in response to detecting the robot control system, transmit an identifier of the welding-type power supply.

In some example welding-type power supplies, the processor is configured to, in response to detecting the robot control system, upload software instructions to the robot control system to facilitate control of the welding-type power supply by the robot control system. In some example welding-type power supplies, the software instructions include at least one of a welding capability of the welding-type power supply, an adjustable parameter of the welding-type power supply, or a parameter limitation of the welding-type power supply. In some example welding-type power supplies, the software instructions include a robotic welding procedure and welding-type parameters to perform the robotic welding procedure. In some example welding-type power supplies, the robotic welding procedure comprises commands to move a robotic manipulator controlled by the robot control system.

In some example welding-type power supplies, the communications circuitry is configured to receive, from the robot control system, data associated with a facility in which at least one of the robot control system or the welding-type power supply is present. In some example welding-type power supplies, the data associated with the facility comprises at least one of a physical mapping, an obstruction location, a location of a robotic manipulator coupled to the robot control system, or a power limitation of an electrical power supply. In some example welding-type power supplies, the communications circuitry is configured to communicate via the auxiliary power connection via IEEE 1901 power line communication.

In some example welding-type power supplies, the processor is configured to control the power conversion circuitry to output the welding-type output power based on communications received via the communications circuitry. In some example welding-type power supplies, the processor is configured to, in response to detecting the robot control system, at least one of prompt for a verification of the robot control system via a user interface or display an identifier associated with the robot control system via the user interface.

Disclosed example welding-type power supplies include: power conversion circuitry configured to convert input power to welding-type output power; communications circuitry configured to communicate via wireless communications; a user interface configured to initiate pairing of the communications circuitry with a robot control system; and a processor configured to, in response to initiation of pairing via the user interface: control the communications circuitry to establish a wireless communications channel with the robot control system according to a pairing process; and in response to establishing the wireless communications channel, configuring the welding-type power supply based on receiving a communication from the robot control system via the communications circuitry.

In some example welding-type power supplies, the processor is configured to control the communications circuitry to establish the wireless communications channel based on an identifier associated with the robot control system and received via the user interface. In some example welding-type power supplies, the user interface comprises an input device configured to initiate the pairing process. In some example welding-type power supplies, the processor is configured to, in response to establishing the wireless communications channel, transmit an identification of capabilities of the welding-type power supply via the wireless communications channel.

In some example welding-type power supplies, the processor is configured to, in response to establishing the wireless communications channel, upload software instructions to the robot control system to facilitate control of the welding-type power supply by the robot control system. In some example welding-type power supplies, the communications circuitry is configured to receive, from the robot control system, data associated with a facility in which at least one of the robot control system or the welding-type power supply is present. In some example welding-type power supplies, the processor is configured to control the power conversion circuitry to output the welding-type output power based on communications received via the communications circuitry. In some example welding-type power supplies, the wireless communications channel comprises at least one of a wireless local area network, a wireless personal area network, or a near field communications channel.

FIG. 1 illustrates an example robotic welding system 100 to perform welding. The example robotic welding system 100 of FIG. 1 includes a welding table 104, a robotic manipulator 106 configured to manipulate a welding torch 108, a welding-type power supply 110, and a robot control system 112.

The welding table 104, robotic manipulator 106, the welding torch 108, the welding-type power supply 110, and/or the robot control system 112, and/or subgroups of these components, may be packaged together (e.g., pre-assembled, pre-calibrated) to provide rapid setup of the robotic welding system 100 for welding at the end-user location. The robotic welding system 100 may be used to make repetitive welds, to leverage the consistency and repeatability advantages of the robotic manipulator 106. In the example of FIG. 1, the robotic manipulator 106 and/or the robot control system 112 are configured as a collaborative robot, which provides features that make the robotic manipulator 106 more conducive to working in areas in which people are proximate the robotic welding system 100.

In the example of FIG. 1, a workpiece 114 is positioned on the welding table 104. The workpiece 114 may include multiple components 114a, 114b which are to be welded together at one or more joints. To provide consistency in arrangement of the workpiece components 114a, 114b, the robotic welding system 100 may further include fixtures 116 attached to the welding table 104. The fixtures 116 may guide the placement of the components 114a, 114b, which can be used to consistently place the multiple components 114a, 114b.

During a welding operation or welding procedure, the robotic welding system 100 manipulates the welding torch 108, such as the illustrated welding torch, to which power is delivered by the welding-type power supply 110 via a first conductor 124 and returned by way of a work cable 126 and a work clamp 128 coupled to the work table 104. The welding equipment may further include, for example, a source of shielding gas 142, a wire feeder 140, and other accessories and/or equipment. Other accessories and/or equipment may include, for example, water coolers, fume extraction devices, one or more controllers, sensors, user interfaces, and/or communication devices (wired and/or wireless).

The example robotic welding system 100 is configured to form a weld using any known electric welding techniques. Example electric welding techniques include shielded metal arc welding (SMAW), MIG, flux-cored arc welding (FCAW), TIG, laser welding, sub-arc welding (SAW), stud welding, friction stir welding, and resistance welding. In some examples, the welding-type power supply 110 and/or other welding equipment are configured to support one or more, but fewer than all, types of welding processes. To change welding processes, the welding-type power supply 110, torch 108, and/or other welding equipment may be removed (e.g., disconnected and moved away from the robotic welding system 100) and replaced by a different welding-type power supply, torch, and/or other welding equipment that supports the desired welding process. To facilitate ease of movement, the example welding equipment may be mounted or attached to a cart 120 or other conveyance (e.g., ground conveyance, hanging conveyance, etc.). Additionally or alternatively, multiple different types of welding equipment (e.g., multiple power supplies having different capabilities, multiple torches, etc.) may be co-located (e.g., proximate to a same robotic manipulator 106, on a rack of equipment, etc.) to enable rapid reconfiguration of the robotic welding system 100.

The example robotic manipulator 106 may operate using any number of degrees of freedom to manipulate the welding torch 108. For example, the robotic manipulator 106 may include multiple joints, in which each joint has one or more degrees of freedom, to achieve multiple orientations for accessing one or more weld joints on the workpiece 114. Whereas conventional welding robots are contained within a weld cell that is protected against intrusion by operators during robot operations (e.g., welding operations and/or other movement by the robot), in some examples the robotic welding system 100 is configured as a robot, has a controller or processor, as well as one or more sensors, that are configured to operate in a manner such that humans do not necessarily need to be excluded from the area in which the robotic manipulator 106 is operating. For example, the robotic manipulator 106 may rapidly detect and respond to collisions, may operate with reduced speed and/or joint torque relative to conventional welding robots, and/or implement other features.

The robotic manipulator 106 is coupled to the table 104 via a base 130. Once secured, the base 130 is fixed with respect to the table 104, and may serve as a reference for position and/or orientation for the robotic manipulator 106.

The example robotic manipulator 106 and/or the example robot control system 112 are configured to transmit commands, requests, data, and/or other messages and/or communications to the power supply 110 via one or more protocols. The robotic manipulator 106 and/or the robot control system 112 are further configured to receive responses, acknowledgments, data, and/or other messages and/or communications from the power supply 110 via the one or more protocols. Based on a robotic welding procedure, the robotic manipulator 106 and/or the robot control system 112 may communicate parameters to the power supply 110 for configuration according to the robotic welding procedure, and/or adjust the welding-type process based on the variables and/or other data obtained from the power supply 110 while performing welding operations. In addition to communication with the power supply 110, the robotic manipulator 106, and/or the robot control system 112, the power supply 110, the robotic manipulator 106, and/or the robot control system 112 may communicate with other welding equipment (e.g., a welding accessory, such as the wire feeder 140) and/or other robotic equipment.

Example power source input parameters that may be transmitted by the robotic manipulator 106 and/or the robot control system 112 to the power supply 110 (e.g., directly, via a network, via a communications bus, etc.) include: a trigger command (e.g., to command the power supply 110 whether to output welding-type power and, when a wire-fed process is used, to command the power supply 110 or a separate wire feeder to feed wire); a purge command (e.g., to command the power supply 110 whether to output shielding gas); a jog command (e.g., to command the power supply 110 or a separate wire feeder whether to feed wire without outputting welding-type power); a schedule parameter (e.g., to select one of one or more previously defined sets of welding parameters); a wire speed parameter (e.g., to cause the power supply 110 or a wire feeder to control wire feeding to a specified rate); a voltage parameter (e.g., to cause the power supply 110 to output the welding-type power using a specified target voltage); an arc length parameter (e.g., to cause the power supply 110 to output the welding-type power based on a specified arc length); a current parameter (e.g., to cause the power supply 110 to output the welding-type power based on a specified target current); an electrode type parameter (e.g., to cause the power supply 110 to configure one or more welding parameters based on a specified electrode type); an electrode diameter parameter (e.g., to cause the power supply 110 to configure one or more welding parameters based on a specified electrode diameter); a gas type parameter (e.g., to cause the power supply 110 to configure one or more welding parameters based on a specified gas type); a material thickness parameter (e.g., to cause the power supply 110 to configure one or more welding parameters based on a specified material thickness of a workpiece); a process parameter (e.g., to cause the power supply 110 to output the welding-type power based on a specified welding-type process, such as pulse, short arc MIG, TIG, stick, etc.); a pulses per second parameter (e.g., to cause the power supply 110 to output the welding-type power based on a specified number of pulses per second in a pulse process); and/or an arc control parameter (e.g., to cause the power supply 110 to output the welding-type power based on a specified arc control, or simulated inductance, parameter). However, different welding-type power supplies may support or lack support for different combinations of these input parameters.

Example power source output parameters that may be transmitted by the power supply 110 the robotic manipulator 106 and/or the robot control system 112 (e.g., directly, via a network, via a communications bus, etc., asymmetrically and/or in response to a request) include: an output indicator (e.g., an indication of whether the power supply 110 is currently outputting welding-type current, an indication of whether the power supply 110 has an active welding-type output, etc.); a current detection indicator (e.g., an indication of whether a current output is currently detected by the power supply 110); a touch detection indicator (e.g., an indication of whether a short circuit is currently measured or detected by the power supply 110); a gas on indicator (e.g., an indication of whether the power supply 110 is currently outputting shielding gas and/or controlling a gas valve to output shielding gas); a ready indicator (e.g., an indication of whether the power supply 110 is in a state in which a welding-type operation could be performed, an indication of whether the power supply 110 is in an error or other state in which a welding-type operation could not be performed, an indication of whether the power supply 110 will respond to a trigger command, etc.); an error indicator (e.g., an indication of whether the power supply 110 is in an error state); a voltage feedback variable (e.g., a measured voltage feedback currently output by the power supply 110, such as the measured instantaneous voltage, the measured average voltage, the measured RMS voltage, etc.); a current feedback variable (e.g., a measured current feedback currently output by the power supply 110, such as the measured instantaneous current, the measured average current, the measured RMS current, etc.); a wire feed speed setpoint variable (e.g., a wire feed speed setpoint with which the power supply 110 or other wire feeder is currently configured); a voltage setpoint variable (e.g., a welding-type voltage setpoint with which the power supply 110 is currently configured, a control loop target voltage, etc.); a current setpoint variable (e.g., a welding-type current setpoint with which the power supply 110 is currently configured, a control loop target current, etc.); and/or an arc length setpoint variable (e.g., an arc length setpoint with which the power supply 110 is currently configured, a control loop arc length target, etc.). However, different welding-type power supplies may support or lack support for different combinations of these output parameters.

Figure 2:
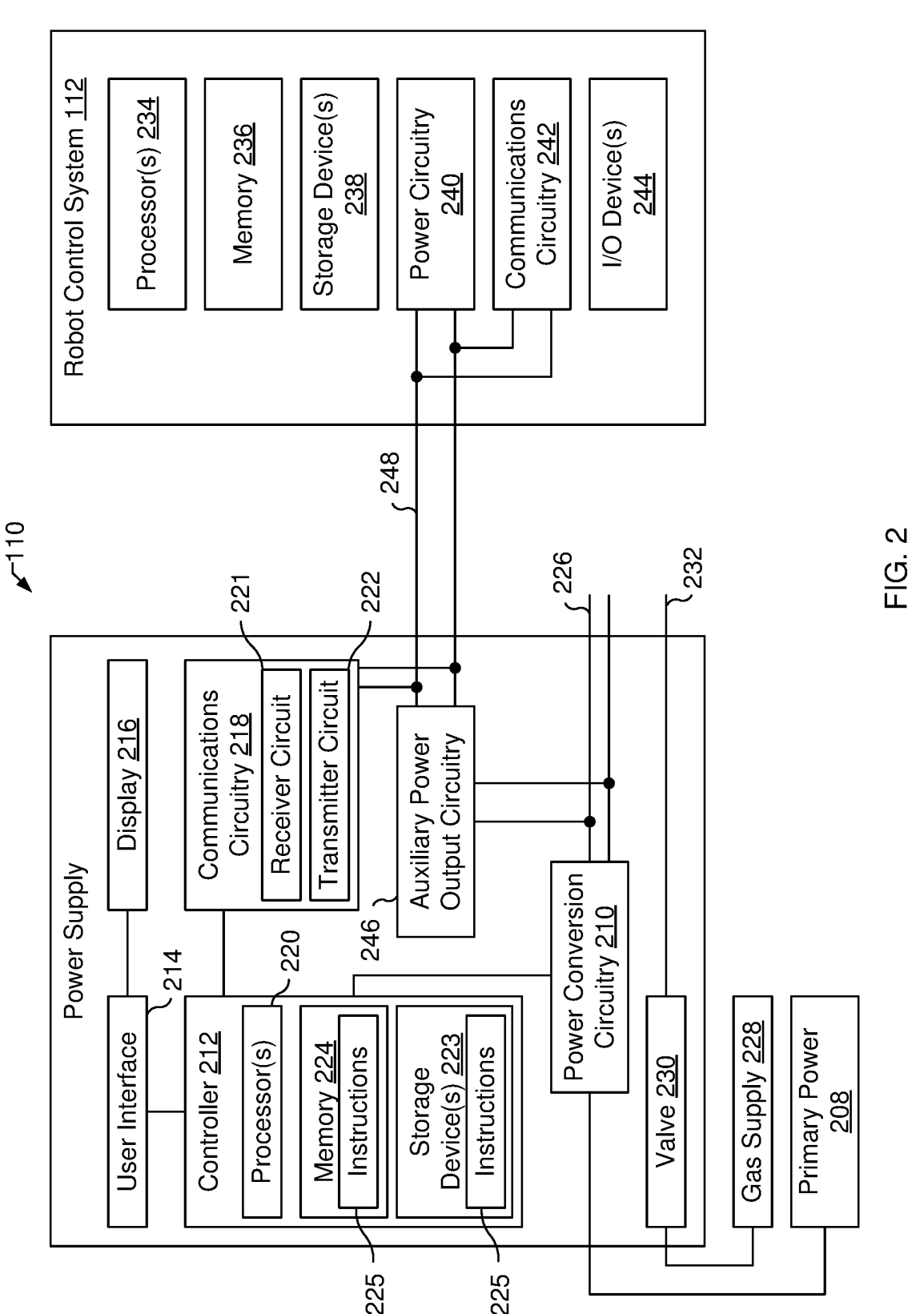
FIG. 2 is a block diagram of an example implementation of the welding-type power supply and the robot control system of FIG. 1.

FIG. 2 is a block diagram of an example implementation of the welding-type power supply 110 and the robot control system 112 of FIG. 1. The example welding-type power supply 110 powers, controls, and supplies consumables to a welding application. In some examples, the welding-type power supply 110 directly supplies input power to the welding torch 108. In the illustrated example, the welding-type power supply 110 is configured to supply power to welding operations and/or preheating operations. The example welding-type power supply 110 may also provide power to a wire feeder to supply electrode wire to the welding torch 108 for various welding applications (e.g., GMAW welding, flux core arc welding (FCAW)).

The welding-type power supply 110 receives primary power 208 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 208 may be supplied from an offsite location (e.g., the primary power may originate from the power grid). The welding-type power supply 110 includes a power conversion circuitry 210, which may include transformers, rectifiers, switches, and so forth, capable of converting the AC input power to AC and/or DC output power as dictated by the demands of the system (e.g., particular welding processes and regimes). The power conversion circuitry 210 converts input power (e.g., the primary power 208) to welding-type power based on a weld voltage setpoint and outputs the welding-type power via a weld circuit.

In some examples, the power conversion circuitry 210 is configured to convert the primary power 208 to both welding-type power and auxiliary power outputs. However, in other examples, the power conversion circuitry 210 is adapted to convert primary power only to a weld power output, and a separate auxiliary converter is provided to convert primary power to auxiliary power. In some other examples, the welding-type power supply 110 receives a converted auxiliary power output directly from a wall outlet. Any suitable power conversion system or mechanism may be employed by the welding-type power supply 110 to generate and supply both weld and auxiliary power.

The welding-type power supply 110 includes a controller 212 to control the operation of the welding-type power supply 110. The welding-type power supply 110 also includes a user interface 214. The controller 212 receives input from the user interface 214, through which a user may choose a process and/or input desired parameters (e.g., voltages, currents, particular pulsed or non-pulsed welding regimes, and so forth). The user interface 214 may receive inputs using any input device, such as via a keypad, keyboard, buttons, touch screen, voice activation system, wireless device, etc. Furthermore, the controller 212 controls operating parameters based on input by the user as well as based on other current operating parameters. Specifically, the user interface 214 may include a display 216 for presenting, showing, or indicating, information to an operator. The controller 212 may also include interface circuitry for communicating data to other devices in the system, such as the wire feeder, the robotic manipulator 106, and/or the robot control system 112. For example, in some situations, welding-type power supply 110 wirelessly communicates with other welding devices within the welding system. Further, in some situations, the welding-type power supply 110 communicates with other welding devices using a wired connection, such as by using a network interface controller (NIC) to communicate data via a network (e.g., ETHERNET, 10baseT, 10base100, etc.).

The controller 212 includes at least one controller or processor 220 that controls the operations of the welding-type power supply 110. The controller 212 receives and processes multiple inputs associated with the performance and demands of the system. The processor 220 may include one or more microprocessors, such as one or more "general-purpose" microprocessors, one or more special-purpose microprocessors and/or ASICS, and/or any other type of processing device. For example, the processor 220 may include one or more digital signal processors (DSPs).

The example controller 212 includes one or more storage device(s) 223 and one or more memory device(s) 224. The storage device(s) 223 (e.g., nonvolatile storage) may include ROM, flash memory, a hard drive, and/or any other suitable optical, magnetic, and/or solid-state storage medium, and/or a combination thereof. The storage device 223 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 224 may include a volatile memory, such as random access memory (RAM), and/or a nonvolatile memory, such as read-only memory (ROM). The memory device 224 and/or the storage device(s) 223 may store a variety of information and may be used for various purposes. For example, the memory device 224 and/or the storage device(s) 223 may store processor executable instructions 225 (e.g., firmware or software) for the processor 220 to execute. In addition, one or more control regimes for various welding processes, along with associated settings and parameters, may be stored in the storage device 223 and/or memory device 224, along with code configured to provide a specific output (e.g., initiate wire feed, enable gas flow, capture welding current data, detect short circuit parameters, determine amount of spatter) during operation.

In some examples, the welding power flows from the power conversion circuitry 210 through a weld cable 226. The example weld cable 226 is attachable and detachable from weld studs at each of the welding-type power supply 110 (e.g., to enable ease of replacement of the weld cable 226 in case of wear or damage). Furthermore, in some examples, welding data is provided with the weld cable 226 such that welding power and weld data are provided and transmitted together over the weld cable 226.

In some examples, the welding-type power supply 110 includes or is implemented in a wire feeder.

The example communications circuitry 218 includes a receiver circuit 221 and a transmitter circuit 222. Generally, the receiver circuit 221 receives data transmitted by the robotic manipulator 106 and/or the robot control system 112, and the transmitter circuit 222 transmits data to the robotic manipulator 106 and/or the robot control system 112.

In some examples, a gas supply 228 provides shielding gases, such as argon, helium, carbon dioxide, and so forth, depending upon the welding application. The shielding gas flows to a valve 230, which controls the flow of gas, and if desired, may be selected to allow for modulating or regulating the amount of gas supplied to a welding application. The valve 230 may be opened, closed, or otherwise operated by the controller 212 to enable, inhibit, or control gas flow (e.g., shielding gas) through the valve 230. Shielding gas exits the valve 230 and flows through a gas line 232 (which in some implementations may be packaged with the welding power output) to the wire feeder which provides the shielding gas to the welding application. In some examples, the welding-type power supply 110 does not include the gas supply 228, the valve 230, and/or the gas line 232.

The example robot control system 112 of FIG. 2 includes processor(s) 234, memory 236, one or more storage device(s) 238, power circuitry 240, communications circuitry 242, and one or more I/O device(s) 244.

The example processor(s) 234 execute instructions to configure and/or program a robotic welding procedure, and/or generates commands to execute a robotic welding procedure via the robotic manipulator 106. The processor(s) 234 may include one or more microprocessors, such as one or more "general-purpose" microprocessors, one or more special-purpose microprocessors and/or ASICS, and/or any other type of processing device. For example, the processor(s) 234 may include one or more digital signal processors (DSPs). The memory device 236 may include a volatile memory, such as random access memory (RAM), and/or a nonvolatile memory, such as read-only memory (ROM). The memory device 236 and/or the storage device(s) 238 may store a variety of information and may be used for various purposes. For example, the memory device 236 and/or the storage device(s) 238 may store processor executable instructions (e.g., firmware or software) for the processor(s) 234 to execute. In addition, one or more control regimes for various robotic manipulators and/or robotic welding procedures, along with associated settings and parameters, may be stored in the storage device(s) 238 and/or memory device 236. The storage device(s) 238 (e.g., nonvolatile storage) may include ROM, flash memory, a hard drive, and/or any other suitable optical, magnetic, and/or solid-state storage medium, and/or a combination thereof. The storage device(s) 238 store data (e.g., data corresponding to a welding application), instructions (e.g., software or firmware to perform welding processes), and/or any other appropriate data.

The power circuitry 240 converts input power to power usable by the robot control system 112 (e.g., by the processor(s) 234, the memory 236, the storage device(s) 238, communications circuitry 242, the I/O device(s) 244, and/or the robotic manipulator 106). In the example of FIG. 2, the robot control system 112 is plugged into welding-type power supply 110 to provide operational power to the robot control system 112 and/or the robotic manipulator 106. In the illustrated example, the power supply 110 includes auxiliary power output circuitry 246, which converts input power (e.g., output power from the power conversion circuitry 210, primary power 208) to auxiliary power, such as a standard AC output (e.g., 120 VAC or 240 VAC at 50 Hz or 60 Hz). In such examples, the robot control system 112 can be plugged into the power supply 110 instead of mains power, and receives the auxiliary power via an auxiliary power connection (e.g., auxiliary power conductors 248 such as an AC power cord).

The example communications circuitry 218 and the communications circuitry 242 of FIG. 2 are configured to communicate via the auxiliary power connection. In examples in which the auxiliary power conductors 248 are configured to transmit 120 VAC power (or other high-voltage AC power), the communications circuitry 218 and the communications circuitry 242 may be configured to comply with the IEEE Standard 1901-2010 and/or any other power line communication standard or technique compatible with high-speed communication over the auxiliary power connection.

The I/O device(s) 244 may include operator or user interfaces and/or other data interfaces. Example I/O device(s) 244 may include a keyboard, a keypad, a mouse, a trackball, a pointing device, a microphone, an audio speaker, a display device, an optical media drive, a multi-touch touch screen, a gesture recognition interface, a magnetic media drive, and/or any other operator interface devices to enable an operator to view information about the robot control system 112, the robotic manipulator 106, a robotic welding procedure, the connected power supply 110 and/or any other connected welding equipment, and/or any other information. For example, the I/O device(s) 244 may include input and/or output device(s) to control movement of the robotic manipulator 106. In other examples, the communications circuitry 242 may also include a communication interface to communicate with and control the robotic manipulator 106.

The power supply 110 may be connected to the example robot control system 112 by plugging the robot control system 112 into the power supply 110 via the auxiliary power connection (e.g., a 120 VAC outlet on the power supply). While the power supply 110 is outputting the auxiliary output power and after the robot control system 112 is powered on and initialized, the power supply 110 and the robot control system 112 may automatically pair by communicating via the auxiliary power connection. To perform the pairing, the power supply 110 detects, via the communications circuitry 218, that the robot control system is coupled to the auxiliary power connection. For example, the communications circuitry 218 (and/or the communications circuitry 242) outputs messages via the auxiliary power connection, which are received and/or acknowledged by the communications circuitry 242 (or the communications circuitry 218).

In response to detecting the robot control system 112 via the auxiliary power connection and receiving communications from the robot control system 112, the controller 212 configures the welding-type power supply 110. For example, upon establishing communication between the robot control system 112 and the power supply 110, the power supply 110 may transmit to the robot control system 112 information that can be used to configure the power supply 110. The robot control system 112 can then provide commands to the power supply 110 to configure the power supply 110 to perform the desired welding processes as part of a robotic welding procedure.

Example information that may be automatically transmitted to the robot control system 112 by the power supply 110 may include an: identifier of a paired welding-type power supply (e.g., a serial number, an assigned name, etc.), an identification of capabilities of a paired welding-type power supply (e.g., a listing of features and/or modifiable parameters, a model number, etc.), software instructions to facilitate control of the welding-type power supply 110 by the robot control system 112 (e.g., a software application or plug-in, software updates, software routines, an API, etc.), identification of a welding capability of the welding-type power supply (e.g., a listing of available welding processes), identification of an adjustable parameter of the welding-type power supply (e.g., parameters that are typically used by an operator, parameters that are modifiable by typically hidden from the operator, robotic welding-specific parameters, etc.) identification of a parameter limitation of the welding-type power supply (e.g., voltage limits, current limits, power limits, wire feed speed limits, frequency limits, etc.), a robotic welding procedure and/or welding-type parameters to perform the robotic welding procedure (e.g., a stored, predefined set of instructions to be implemented by the robot control system 112 to perform a robotic welding procedure), and/or any other information that may be transferred between the power supply 110 and the robot control system 112. Additionally or alternatively, the welding-type power supply 110 may transmit one or more available real-time process data streams, such as welding current measurements, output voltage measurements, wire feed speed measurements. The robot control system 112 may use real-time process data streams for other aspects of the robotic welding procedure, such as process control, seam tracking, and/or any other control.

Additionally or alternatively, the welding-type power supply 110 may transmit information about physical system needs, such as the need for physical isolation or other physical configuration to be performed by the operator, to the robot control system 112. Based on the physical configuration information, the robot control system 112 may display the physical information to an operator via a display or otherwise notify the operator of the physical requirements. Additionally or alternatively, the welding-type power supply 110 may transmit system status information about one or more components of the welding system, for display by the robot control system 112 or other action. Example welding equipment system status information may include internal temperature measurements, airflow measurements, coolant circulation information, error codes and/or other diagnostic information, and/or any other status information.

In some examples, the welding-type power supply 110 and/or the robot control system 112 may store information about the most recent system to which the power supply 110 or the robot control system 112 was pairing or connected. This information can then be used to quickly configure a subsequent robot control system to which the power supply 110 is paired or connected, or a subsequent power supply to which the robot control system 112 is paired or connected. For example, an operator may wish to move a power supply 110 from robot station to robot station within a fabrication shop, and have the applicable robot configuration parameters be applied to each robot that is connected or paired to the power supply 110. When the power supply 110 is paired or connected to each subsequent robot control system, the power supply 110 may automatically, or in response to operator input, transmit the robot configuration information to the robot control system to quickly configure the robot control system to perform robotic welding procedures.

In some examples, the welding-type power supply 110 and/or the robot control system 112 automatically update stored robotic welding procedures when changes are made to a stored robotic welding procedure that is imported for use. Additionally or alternatively, the welding-type power supply 110 and/or the robot control system 112 may maintain and store update histories of robotic welding procedures and/or parameters. When an operator makes a change to a robotic welding procedure stored on a power supply 110 (or robot control system 112), and then pairs the power supply 110 (or robot control system 112) to a different robot control system (or different power supply), the previous changes to the robotic welding procedure are automatically recognized and applied, and/or are easily applied and/or easily reverted via a user interface.

Figure 3:
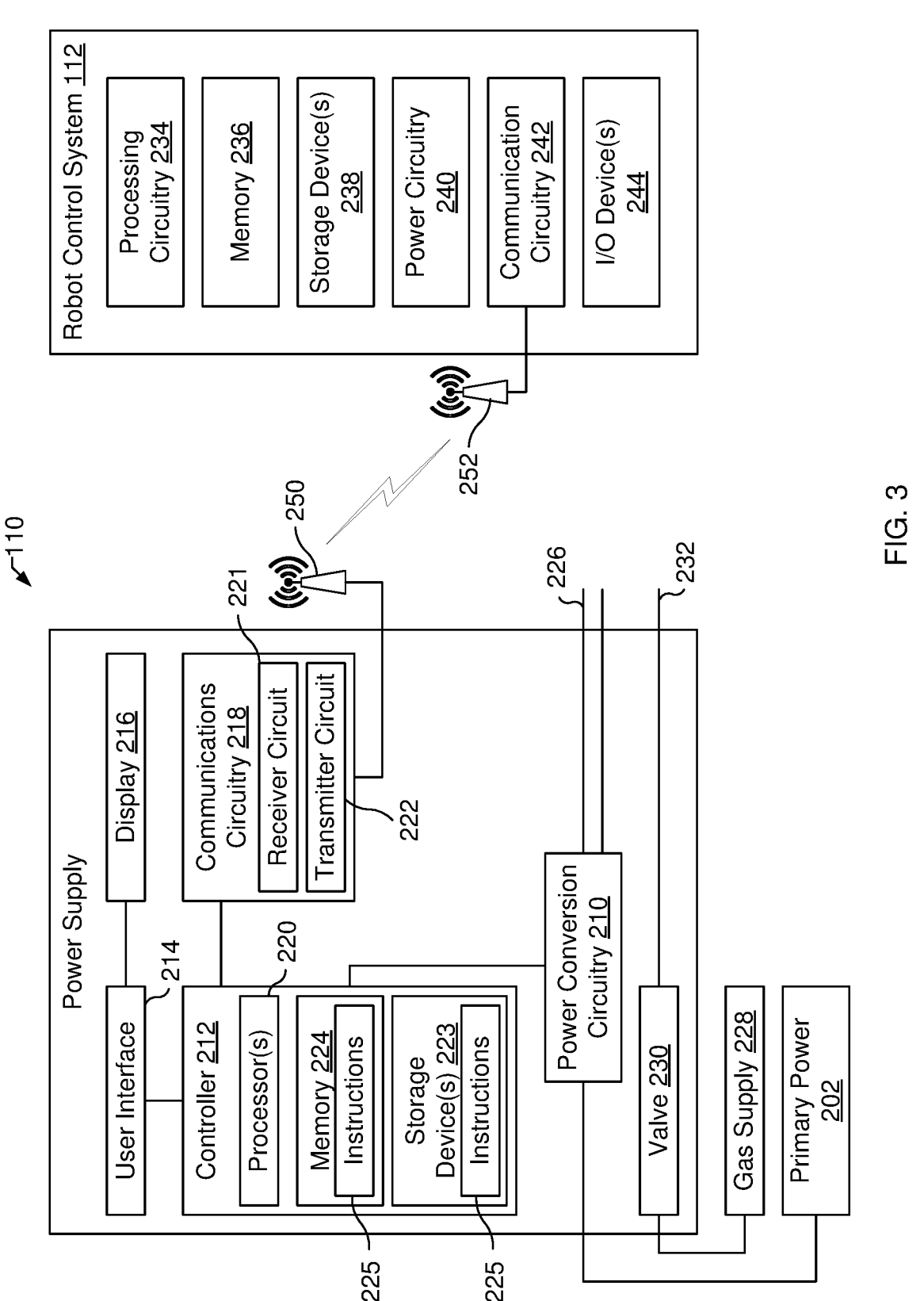
FIG. 3 is a block diagram of another example implementation of the welding-type power supply and the robot control system of FIG. 1.

FIG. 3 is a block diagram of another example implementation of the welding-type power supply 110 and the robot control system 112 of FIG. 1. The example power supply 110 of FIG. 3 includes the components of the example power supply 110 of FIG. 2, but may include or omit the auxiliary power output circuitry 246. The example robot control system 112 of FIG. 3 includes the components of the robot control system 112 of FIG. 2.

In contrast with the power line communication of FIG. 2, the example welding-type power supply 110 and the robot control system 112 of FIG. 3 communicate via wireless communications. To this end, the example communications circuitry 218 and communications circuitry 242 are connected to respective antennas 250, 252.

While establishment of communications may occur automatically using power line communications as in FIG. 2, the example robot control system 112 and/or the power supply 110 may require initiation of pairing by the operator (e.g., via the user interface 214 and the I/O device(s) 244) to establish communication between the robot control system 112 and/or the power supply 110. For example, the operator may select a "Pair" button on each of the user interface 214 of the power supply 110 and a user interface of the robot control system 112, which then causes the communications circuitry 218 and the communications circuitry 242 to perform a pairing procedure. Upon establishing the communications channel via pairing, the power supply 110 and the robot control system 112 automatically exchange information and/or configure the power supply 110 as discussed above. In some examples, the operator may further be prompted to verify the pairing occurred between the desired power supply 110 and robot control system 112 (e.g., neither the power supply 110 nor the robot control system 112 paired with an unintended device nearby).

Figure 4A:
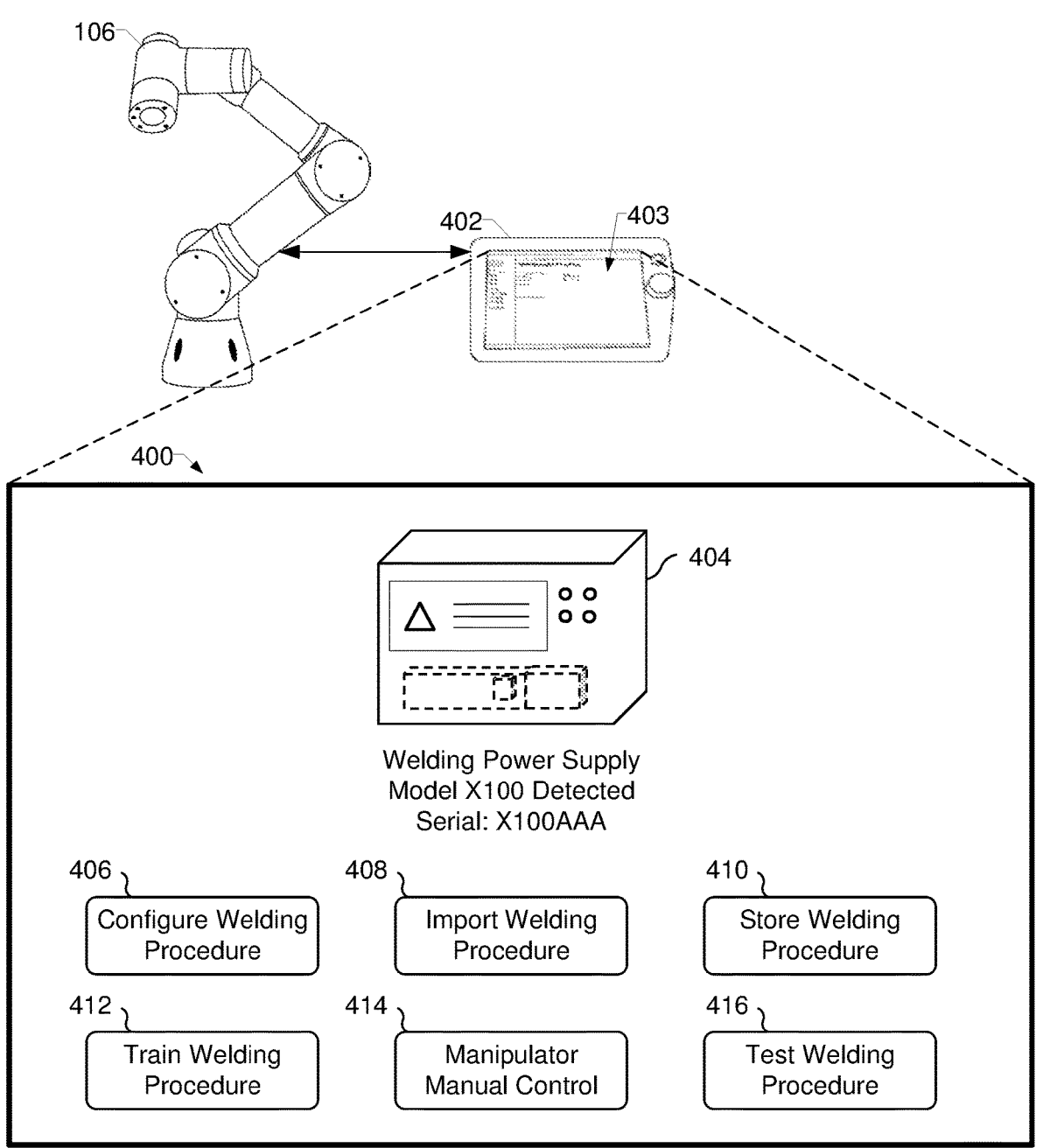
FIGS. 4A-4D illustrate example interface screens that may be presented by a user interface of the robot control system of FIGS. 1-3 based on pairing the welding-type power supply with the robot control system.

FIG. 4A illustrates an example interface screen 400 that may be presented by a user interface 402 of the robot control system 112 of FIGS. 1-3 based on pairing the welding-type power supply 110 with the robot control system 112. The example robot control system 112 may be implemented at least partially within a computing system having a display 403, which displays the interface screen 400.

The example interface screen 400 may be presented following the establishment of a communication channel (e.g., automatically via the power line communication, via the pairing process for a wireless communications channel) and automatic transmission of information from the power supply 110 to the robot control system 112. In the illustrated example, the power supply 110 has provided an identifier of the welding-type power supply 110 (e.g., a serial number) and an indication of the capabilities of the power supply 110. The interface screen 400 displays a representation 404 of the power supply 110, including an image of the power supply 110, the model number, and the serial number provided by the power supply 110.

The interface screen 400 further includes buttons 406-416 to configure a robotic welding procedure (button 406), import a robotic welding procedure (button 408) (e.g., from the power supply 110, from an external storage device, from an external computing device via a network, etc.), store a robotic welding procedure (button 410) (e.g., on the power supply 110, on an external storage device, on an external computing device via a network, etc.), train a robotic welding procedure (button 412) (e.g., via guiding the manipulator, via a robotic training system, etc.), manually control a manipulator (button 414), and test a welding procedure (button 416).

Figure 4B:
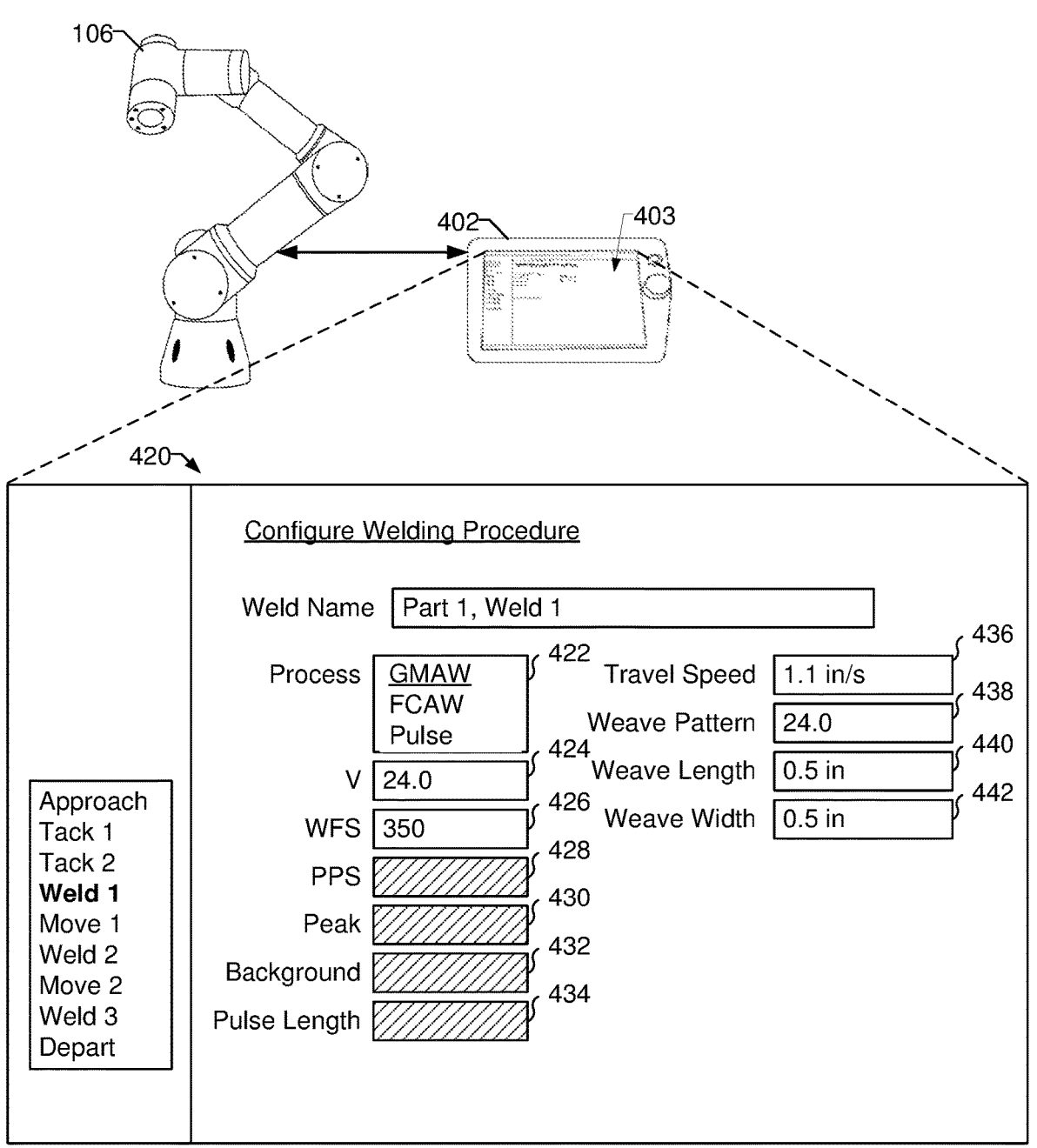

Selecting the button 406 to configure the welding procedure causes the interface screen to present a robotic welding procedure configuration interface. FIG. 4B illustrates an example robotic welding procedure configuration interface 420 based on information provided by a first welding-type power supply having first capabilities. The example configuration interface 420 of FIG. 4B includes inputs for welding process 422, voltage 424, wire feed speed 426, pulses per second 428, pulse peak voltage 430, pulse background voltage 432, pulse length 434, travel speed 436, weave pattern 438, weave length 440, and weave width 442. However, any other electrical and/or physical parameters may be defined via the configuration interface 420.

Figure 4C:
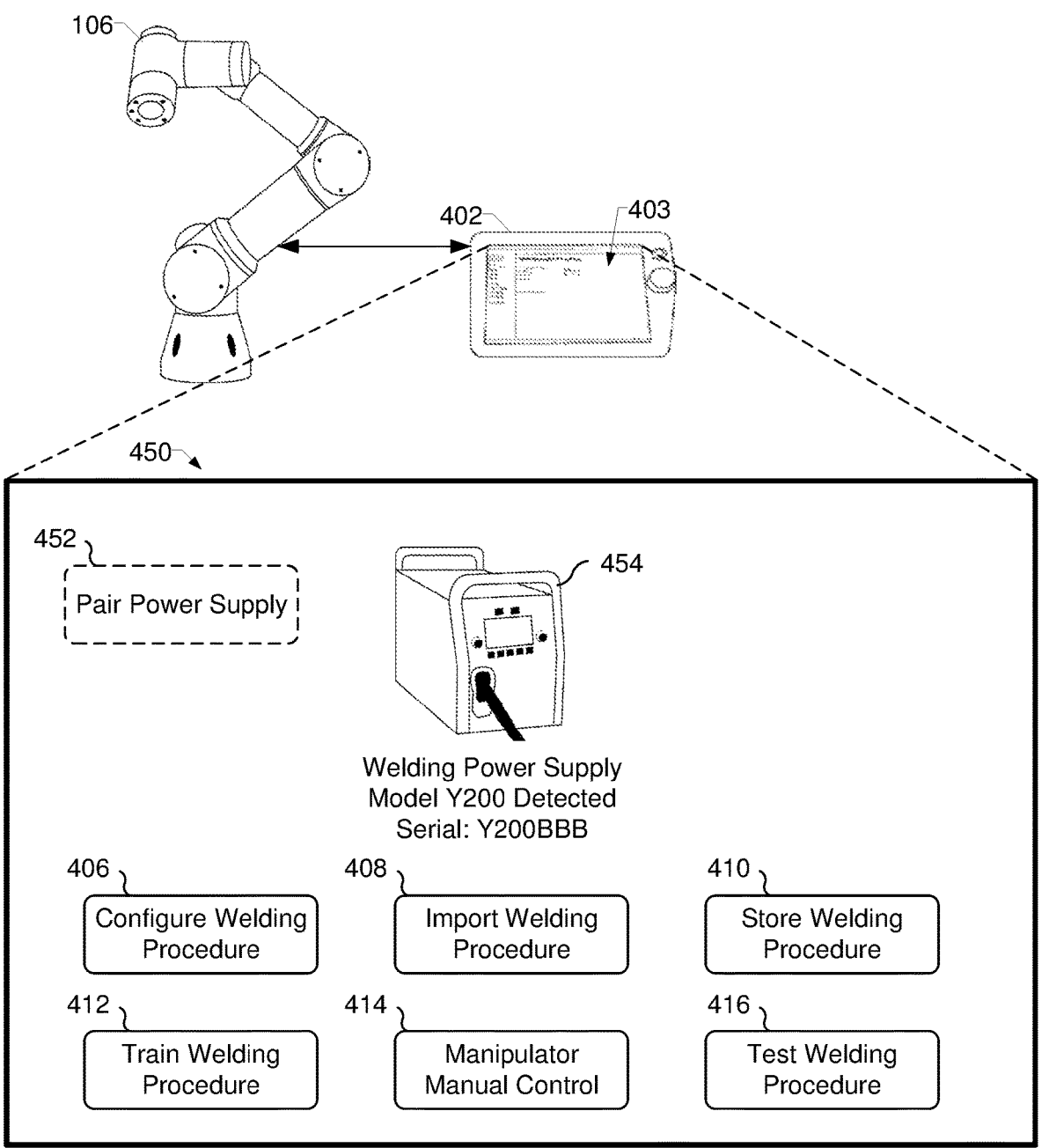

FIG. 4C illustrates another example interface screen 450 that may be presented by the user interface 402 of the robot control system 112 of FIGS. 1-3 based on pairing another welding-type power supply with the robot control system 112. The example interface screen 450 may be based on a robot control system 112 having a wireless communication interface (e.g., the antenna 252 and communications circuitry 242 of FIG. 3).

The interface screen 450 includes the buttons 406-416 of FIG. 4A. While the robot control system 112 is not paired to a power supply, the interface screen 450 further includes a button to pair 452 the robot control system 112 to a power supply. For example, in response to selecting the pairing button 452, the robot control system 112 enters a pairing mode, in which the communications circuitry 242 attempts to identify a power supply that is also in a pairing mode and/or broadcasts pairing information to enable a power supply to attempt to pair with the robot control system 112.

In the illustrated example, the power supply has provided a different identifier of the welding-type power supply 110 (e.g., a serial number) and an indication of the capabilities of the power supply 110. The interface screen 400 displays a representation 454 of the power supply 110, including an image of the power supply 110, the model number, and the serial number provided by the power supply 110.

Figure 4D:
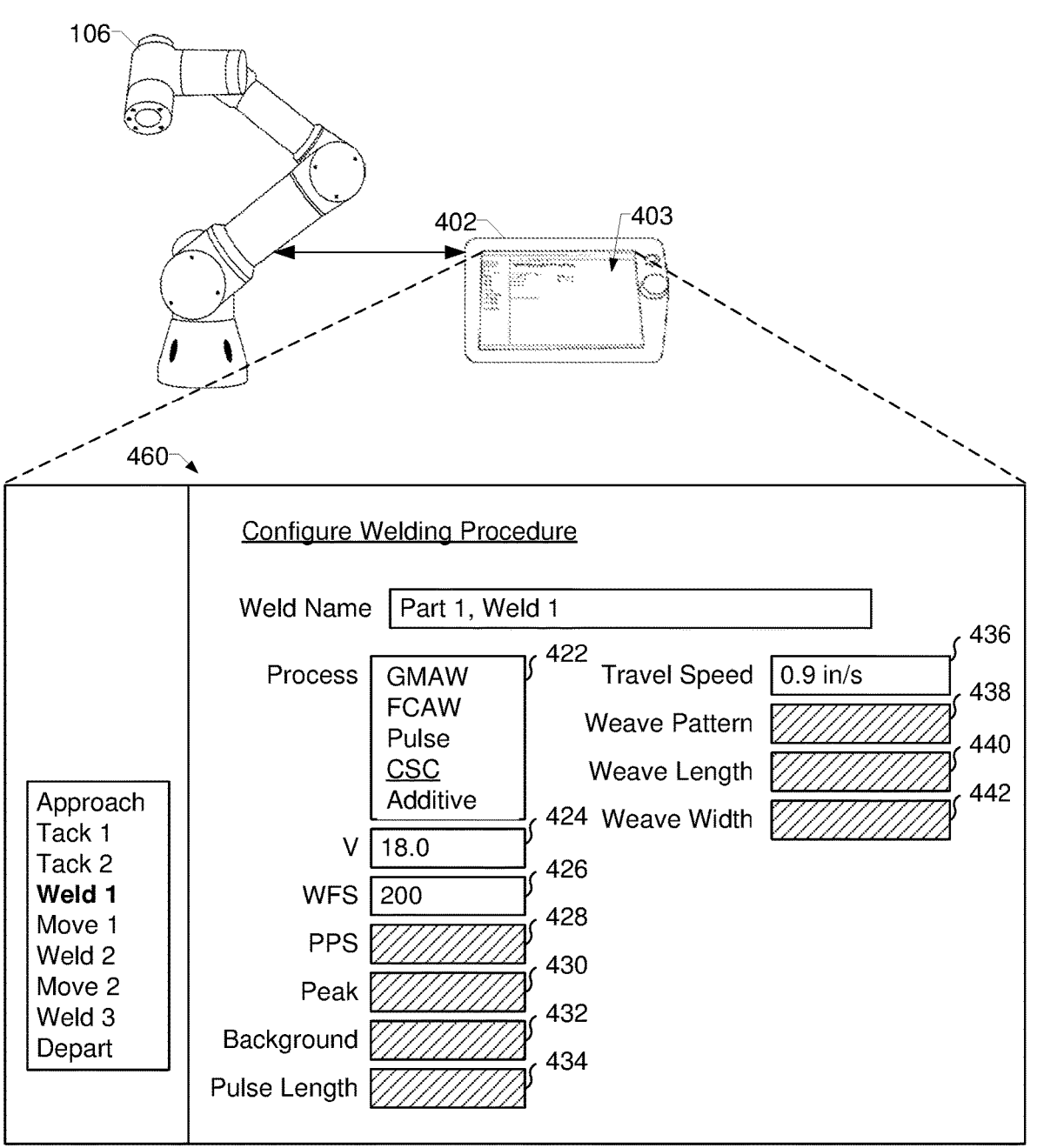

FIG. 4D illustrates an example robotic welding procedure configuration interface 460 based on information provided by a second welding-type power supply having second capabilities different than the first capabilities of FIG. 4B. In the example of FIG. 4D, the second power supply may indicate that the power supply supports additional processes, such as controlled short circuit (CSC) and/or additive manufacturing (additive) that are not supported by the first power supply of FIG. 4B.

Figure 5:
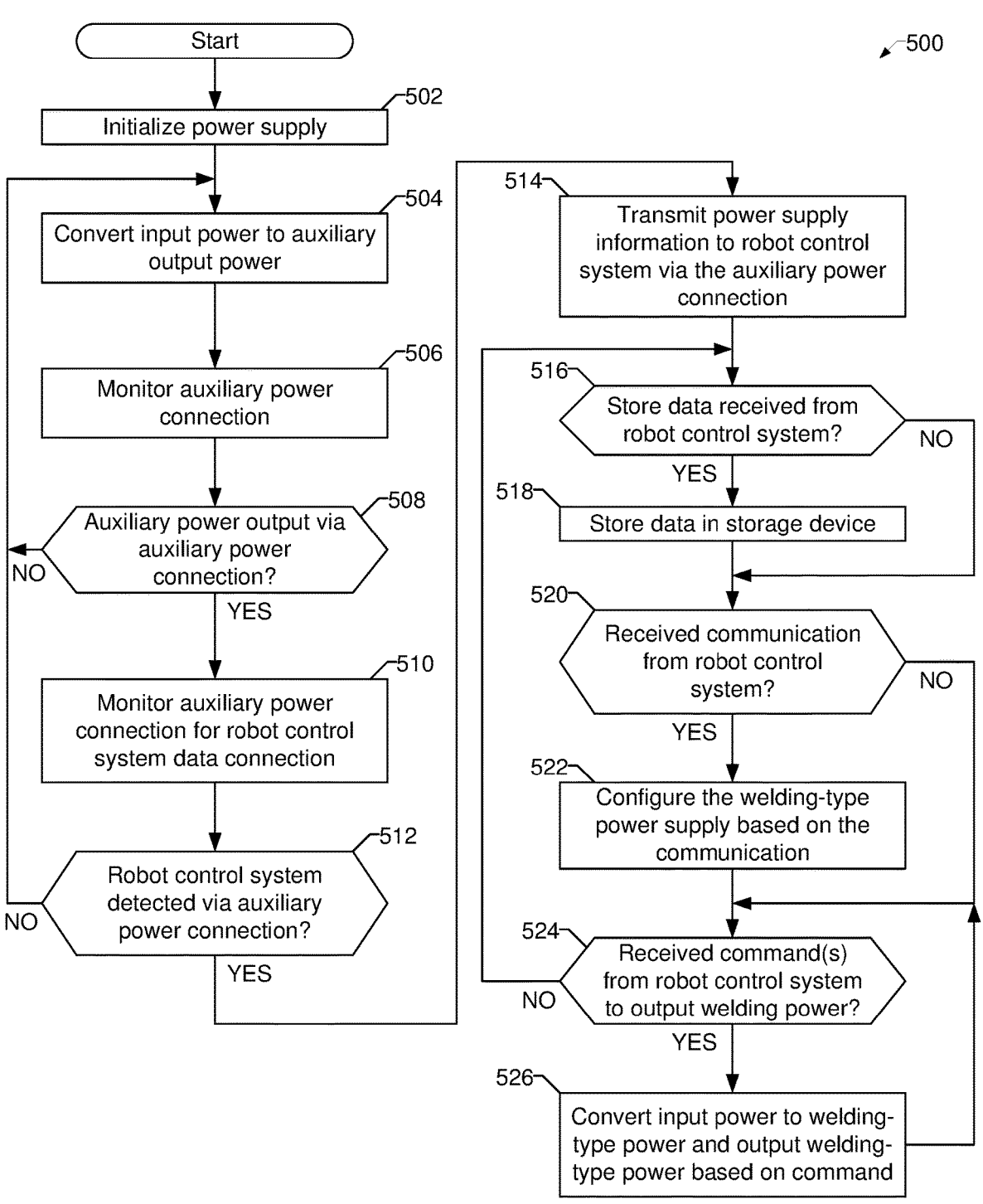
FIG. 5 is a flowchart representative of example machine readable instructions which may be executed by the example welding-type power supply of FIGS. 1 and 2 to pair a welding-type power supply and a robot control system based on a power line connection and to configure the power supply.

FIG. 5 is a flowchart representative of example machine readable instructions 500 which may be executed by the example robotic welding system 100 of FIGS. 1 and 2 to pair a welding-type power supply 110 and a robot control system 112 based on a power line connection and to configure the power supply 110. The example instructions 500 are described below with reference to FIG. 2.

At block 502, the example processor 220 initializes the power supply 110. At block 504, the processor 220 controls the auxiliary power output circuitry 246 to convert input power to auxiliary output power. For example, the auxiliary power output circuitry 246 may receive input power from an output of the power conversion circuitry 210 and/or the primary power 208, and output a 120 VAC or 240 VAC output power via an auxiliary power connection.

At block 506, the processor 220 monitors the auxiliary power connection. For example, the processor 220 may monitor a control loop used to control the auxiliary power output circuitry 246, and/or may monitor a current sensor to determine whether there is an output current from the auxiliary power output circuitry 246. At block 508, the processor 220 determines whether auxiliary power is being output via the auxiliary power connection (e.g., via a plug, via the auxiliary power conductors 248). If auxiliary power is not being output (block 508), control returns to block 504 to continue converting the input power to the auxiliary output power.

If auxiliary power output is detected (block 508), at block 510 the communications circuitry 218 monitors the auxiliary power connection for a robot control system data connection. For example, the communications circuitry 218 may output messages to establish a connection via the auxiliary power connection and/or monitor for messages from the communications circuitry 242 of the robot control system 112.

At block 512, the processor 220 determines whether a robot control system has been detected via the auxiliary power connection. If a robot control system is not detected (block 512), control returns to block 504. When a robot control system is detected (block 512), at block 514 the processor transmits power supply information to the robot control system 112 via the auxiliary power connection.

At block 516, the processor 220 determines whether data received from the robot control system 112 is to be stored (e.g., on the storage device(s) 223). For example, the robot control system 112 may transmit data such as a robotic welding procedure to the power supply 110 for storage and reuse as the power supply 110 is moved to different areas of a fabrication shop and attached to different robotic welding systems. If data has been received from the robot control system 112 to be stored (block 516), at block 518 the processor 220 stores the data in the storage device(s) 223.

After storing the data (block 518), or if data for storage has not been received (block 516), at block 520 the processor 220 determines whether a communication has been received from the robot control system 112. For example, the robot control system 112 may transmit commands and/or data to the power supply 110 to configure processes and/or parameters of the power supply 110 for a robotic welding procedure. If a communication has been received (block 520), at block 522 the processor 220 configures the power supply 110 based on the communication. For example, the processor 220 may configure one or more parameters of the power supply 110 to control output of welding-type power by the power conversion circuitry 210 based on commands and/or data in the received communication.

After configuring the power supply 110 (block 522), or if a communication has not been received (block 520), at block 524 the processor 220 determines whether command(s) have been received from the robot control system 112 to output welding-type power. Example commands may include starting a weld output or stopping a weld output. If a command to output welding-type power has been received (block 524), control returns to block 516.

If a command to output welding-type power has been received (block 524), at block 526 the processor 220 controls the power conversion circuitry 210 to convert input power to welding-type power based on the command. Control then returns to block 524 to monitor for further commands.

Figure 6:
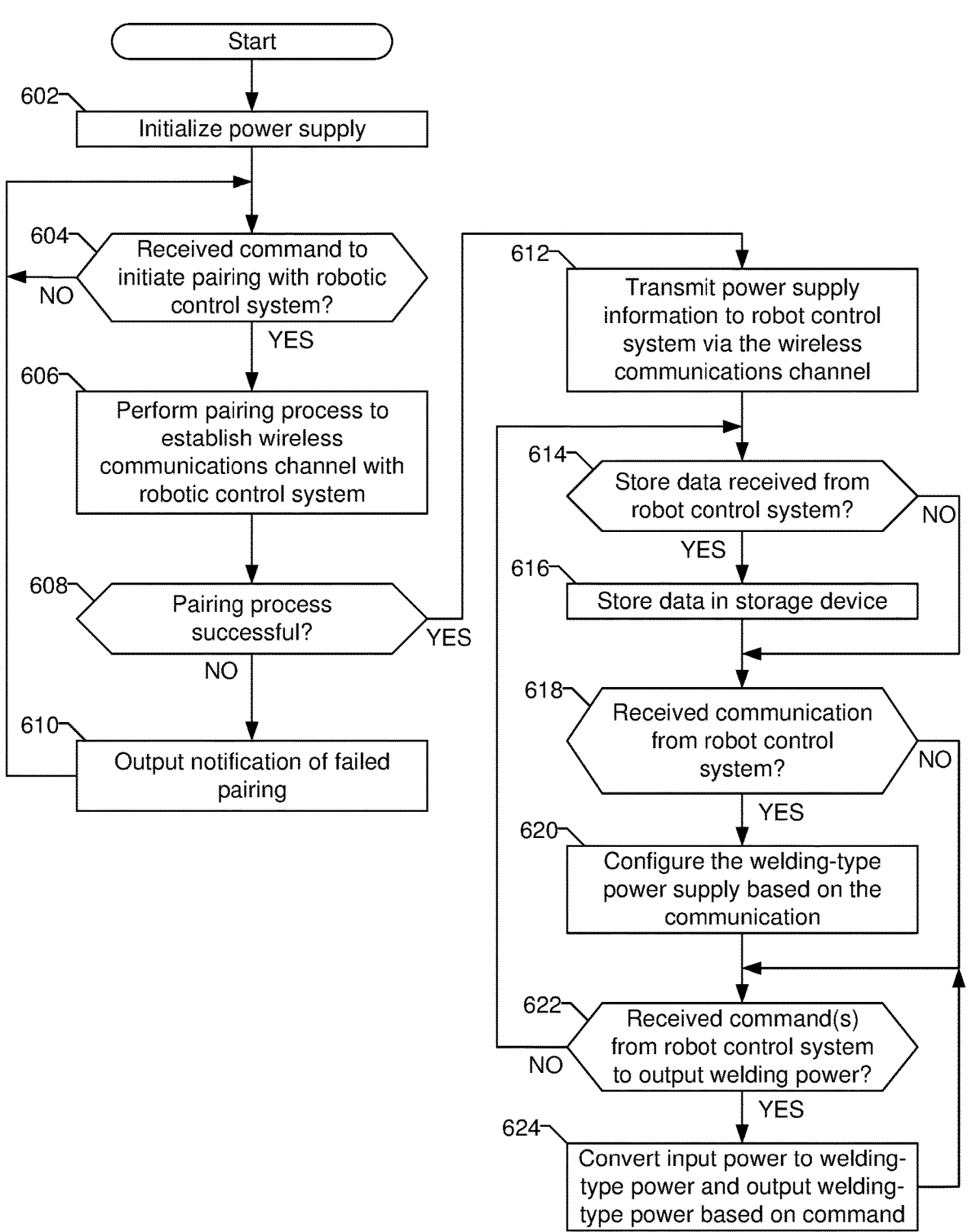
FIG. 6 is a flowchart representative of example machine readable instructions which may be executed by the example welding-type power supply of FIGS. 1 and 3 to pair a welding-type power supply and a robot control system via a wireless connection and to configure the power supply.

FIG. 6 is a flowchart representative of example machine readable instructions 600 which may be executed by the example robotic welding system 100 of FIGS. 1 and 3 to pair a welding-type power supply 110 and a robot control system 112 via a wireless connection and to configure the power supply 110. The example instructions 600 are described below with reference to FIG. 2.

At block 602, the example processor 220 initializes the power supply 110. At block 604, the processor 220 determines whether a command has been received to initiate pairing with a robotic control system. For example, the operator may initiate pairing via the user interface 214. If a command to initiate pairing has not been received (block 804), control returns to block 804 to await pairing. In some examples, pairing is also initiated by the operator on the robot control system (e.g., via the I/O device(s) 244 of the robot control system 112) that is to be paired with the welding-type power supply 110, such as by putting the intended robot control system into a pairing mode to facilitate correct pairing. If a command to initiate pairing has not been received (block 604), control returns to block 604 to await pairing.

When a command to initiate pairing has been received (block 604), at block 606 the processor 220 performs a pairing process to establish a wireless communications channel with the robot control system 112. For example, the communications circuitry 218 may establish the wireless communications channel using any suitable wireless protocol. At block 608, at block 610 the processor 220 determines whether the pairing was successful. If the pairing was not successful (block 608), the processor 220 outputs a notification of a failing pairing process (e.g., via the user interface 214) and control returns to block 604 to await a further pairing command.

If the pairing is successful (block 608) at block 612 the processor transmits power supply information to the robot control system 112 via the wireless communications channel.

At block 614, the processor 220 determines whether data received from the robot control system 112 is to be stored (e.g., on the storage device(s) 223). For example, the robot control system 112 may transmit data such as a robotic welding procedure to the power supply 110 for storage and reuse as the power supply 110 is moved to different areas of a fabrication shop and attached to different robotic welding systems. If data has been received from the robot control system 112 to be stored (block 614), at block 616 the processor 220 stores the data in the storage device(s) 223.

After storing the data (block 616), or if data for storage has not been received (block 614), at block 618 the processor 220 determines whether a communication has been received from the robot control system 112. For example, the robot control system 112 may transmit commands and/or data to the power supply 110 to configure processes and/or parameters of the power supply 110 for a robotic welding procedure. If a communication has been received (block 618), at block 620 the processor 220 configures the power supply 110 based on the communication. For example, the processor 220 may configure one or more parameters of the power supply 110 to control output of welding-type power by the power conversion circuitry 210 based on commands and/or data in the received communication.

After configuring the power supply 110 (block 620), or if a communication has not been received (block 618), at block 622 the processor 220 determines whether command(s) have been received from the robot control system 112 to output welding-type power. Example commands may include starting a weld output or stopping a weld output. If a command to output welding-type power has been received (block 622), control returns to block 614.

If a command to output welding-type power has been received (block 622), at block 624 the processor 220 controls the power conversion circuitry 210 to convert input power to welding-type power based on the command. Control then returns to block 622 to monitor for further commands.

Figure 7:
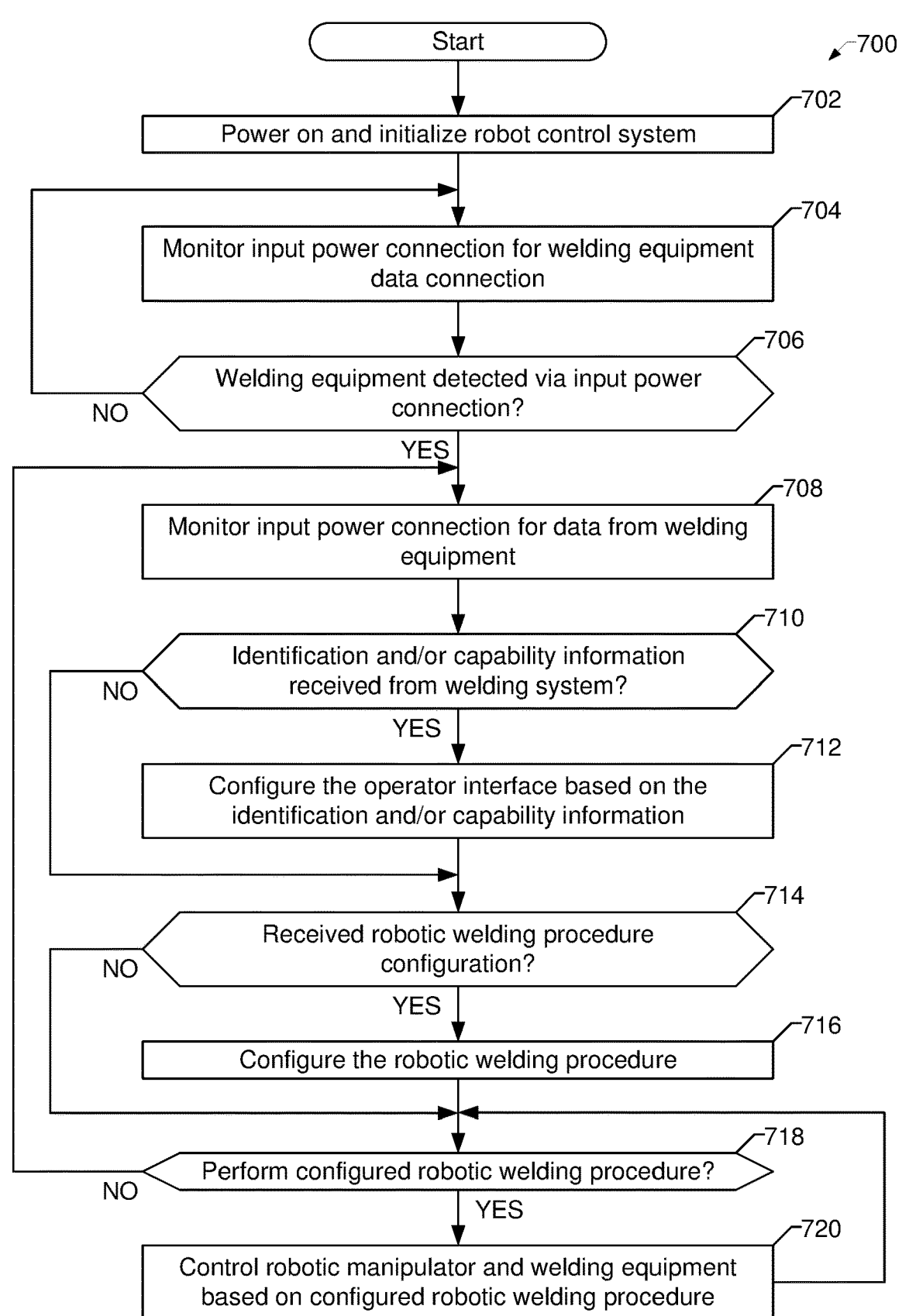
FIG. 7 is a flowchart representative of example machine readable instructions which may be executed by the example robot control system of FIGS. 1 and 2 to pair a welding-type power supply and a robot control system based on a power line connection and to configure the power supply.

FIG. 7 is a flowchart representative of example machine readable instructions 700 which may be executed by the example robot control system 112 of FIGS. 1 and 2 to pair a welding-type power supply 110 and a robot control system 112 based on a power line connection and to configure the power supply. The example instructions 700 are described below with reference to the robot control system 112 of FIG. 2. The example instructions 700 may be performed when, for example, the robot control system 112 is plugged into a power source such as the auxiliary power connection provided by the power supply 110 of FIG. 2.

At block 702, the robot control system 112 is powered on and initialized. For example, the power circuitry 240 may convert input power from the power supply 110 to power usable by the processor(s) 234, the communications circuitry 242, the I/O devices 244, and/or the robotic manipulator 106.

At block 704, the communications circuitry 242 monitors the input power connection (e.g., the auxiliary power conductors 248) for a welding equipment data connection. For example, the communications circuitry 242 may determine whether data is received from a welding-type power supply via a power line communication and/or whether a response is to data transmitted by the communications circuitry 242 via power line communication has been received.

At block 706, the processor(s) 234 determine whether welding equipment has been detected (e.g., via the communications circuitry 242) via the input power connection. If welding equipment has not been detected (block 706), control returns to block 704 to monitor for welding equipment.

When welding equipment has been detected (block 706), at block 708 the communications circuitry 242 monitors the input power connection (e.g., the auxiliary power conductors 248) for data from the detected welding equipment. For example, the power supply 110 may automatically transmit identification and/or other data to the robot control system 112 via the auxiliary power connection (e.g., the input power connection to the robot control system 112) upon detection of the power line communication channel.

At block 710, the processor(s) 234 determine whether identification and/or capability information has been received from the connected welding system. Example identification and/or capability information includes: an identifier of a paired welding-type power supply, an identification of capabilities of a paired welding-type power supply, software instructions to facilitate control of the welding-type power supply by the robot control system, identification of a welding capability of the welding-type power supply, identification of an adjustable parameter of the welding-type power supply, identification of a parameter limitation of the welding-type power supply, a robotic welding procedure and/or welding-type parameters to perform the robotic welding procedure, and/or any other information that may be transferred between the power supply 110 and the robot control system 112.

If identification and/or capability information has been received from the connected welding system (block 710), at block 712 the processor(s) 234 configure the operator interface (e.g., the interface screens 400, 420 of FIGS. 4A and 4B) based on the identification and/or capability information. For example, the processor(s) 234 may determine welding-related capabilities of the power supply 110 based on a look up of identification information, specific indications of capabilities and/or limitations, and/or other identification and/or capability information. Using the identification and/or capability information, the processor(s) 234 may present or omit certain capabilities and/or parameters, limit parameters, and/or otherwise enable and/or disable different features or options when presenting an interface enabling an operator to configure a robotic welding procedure. Additionally or alternatively, the processor(s) 234 may compare a configured robotic welding procedure against the capabilities and/or limitations determined based on the received identification and/or capability information, and output indication(s) of any identified conflicts between the procedure and the capabilities or limitations.

After configuring the operator interface (block 712), or if identification and/or capability information has not been received (block 712), at block 714 the processor(s) 234 determine whether a robotic welding procedure configuration has been received. For example, the processor(s) 234 may receive configurations and/or changes to a robotic welding procedure via an operator interface (e.g., the interface 420 of FIG. 4B) and the I/O devices 244.

If a robotic welding procedure configuration has been received (block 714), at block 716 the processor(s) 234 configure a robotic welding procedure. For example, the processor(s) 234 may store an updated robotic welding procedure based on the received configuration information and/or changes to a configuration in the memory 236 and/or in the storage device(s) 238.

After configuring the robotic welding procedure (block 716), or if configuration information has not been received (block 714), at block 718 the processor(s) 234 determine whether a selected robotic welding procedure is to be performed. For example, the operator may initiate one or more iterations of a selected robotic welding procedure via the operator interface and the I/O device(s) 244. If a selected robotic welding procedure is not to be performed (block 718), control returns to block 710 to continue monitoring the input power connection for data.

If a selected robotic welding procedure is to be performed (block 718), at block 720 the processor(s) 234 control the robotic manipulator 106 (e.g., via the I/O device(s) 244) and the welding equipment (e.g., via the communications circuitry 242) to perform the configured robotic welding procedure. Control then returns to block 718.

In some examples, the instructions 500 of FIG. 5 and the instructions 700 of FIG. 7 are performed in conjunction to establish power line communications when the robot control system 112 is plugged into an auxiliary power output of the power supply 110, and automatically configure the power supply 110 and/or the robot control system 112.

Figure 8:
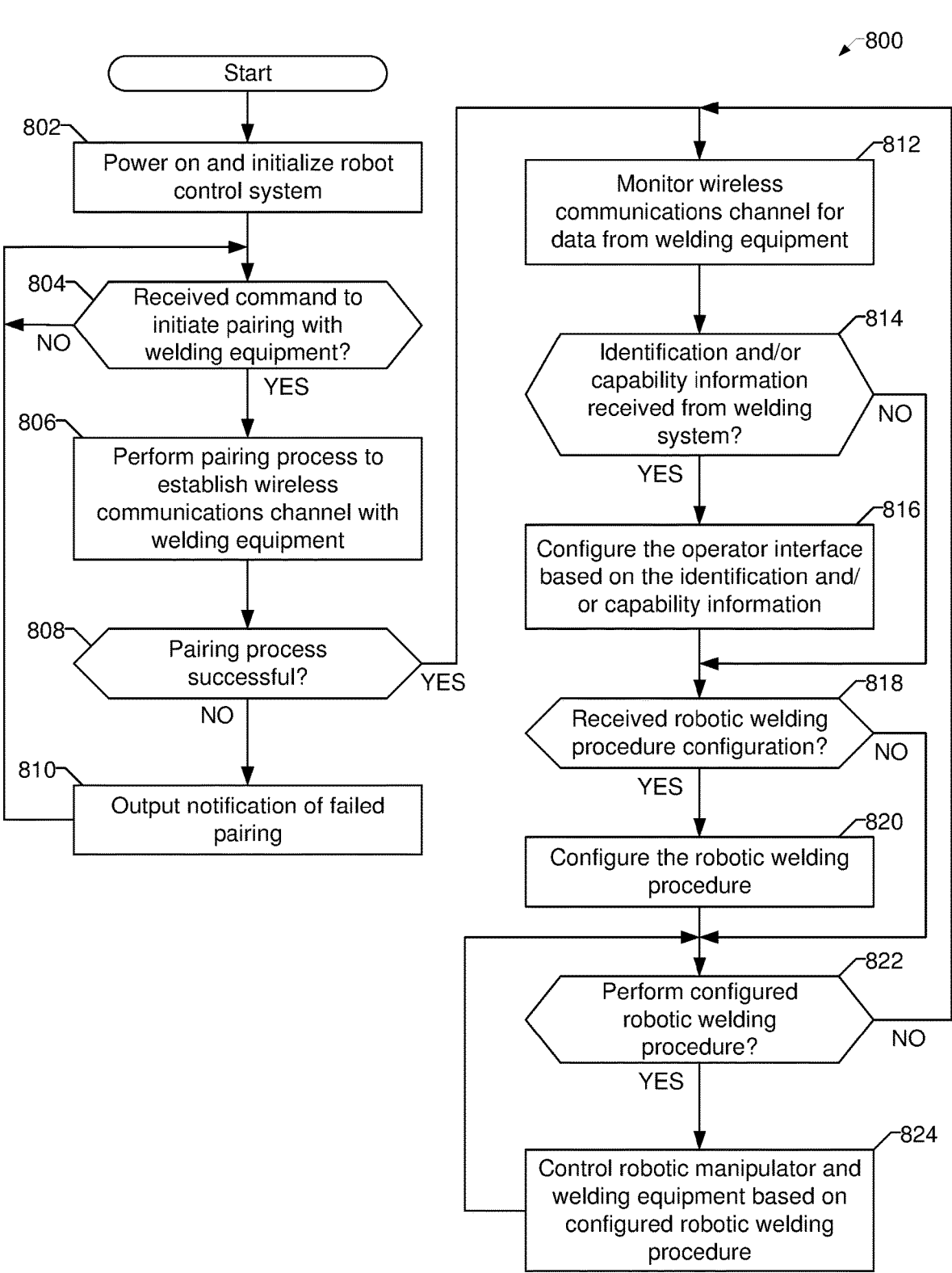
FIG. 8 is a flowchart representative of example machine readable instructions which may be executed by the example robot control system of FIGS. 1 and 3 to pair a welding-type power supply and a robot control system via a wireless connection and to configure the power supply.

FIG. 8 is a flowchart representative of example machine readable instructions which may be executed by the example robot control system 112 of FIGS. 1 and 3 to pair a welding-type power supply 110 and a robot control system 112 via a wireless connection and to configure the power supply. The example instructions 800 are described below with reference to the robot control system 112 of FIG. 3. The example instructions 700 may be performed when, for example, the robot control system 112 is plugged into a power source.

At block 802, the robot control system 112 is powered on and initialized. For example, the power circuitry 240 may convert input power to power usable by the processor(s) 234, the communications circuitry 242, the I/O devices 244, and/or the robotic manipulator 106.

At block 804, the processor(s) 234 determine whether a command has been received to initiate pairing with welding equipment (e.g., the welding-type power supply 110). For example, the operator may initiate pairing via a user interface and the I/O devices 244. If a command to initiate pairing has not been received (block 804), control returns to block 804 to await pairing. In some examples, pairing is also initiated by the operator on the welding equipment (e.g., on the user interface 214 of the power supply 110) that is to be paired with the robot control system 112, such as by putting the intended robot control system into a pairing mode to facilitate correct pairing.

When a command to initiate pairing has been received (block 804), at block 804 the processor(s) 234 perform a pairing process to establish a wireless communications channel with the power supply 110. For example, the communications circuitry 242 may establish the wireless communications channel using any suitable wireless protocol. At block 808, the processor(s) 234 determine whether the pairing was successful. If the pairing was not successful (block 808), at block 810 the processor(s) 234 output a notification of a failing pairing process (e.g., via the user interface 214) and control returns to block 804 to await a further pairing command.

If the pairing is successful (block 808), at block 812 the communications circuitry 242 monitors the wireless communications channel (e.g., via the antenna 252) for data from the detected welding equipment. For example, the power supply 110 may automatically transmit identification and/or other data to the robot control system 112 via the wireless communications channel upon detection of the wireless communications channel.

At block 814, the processor(s) 234 determine whether identification and/or capability information has been received from the connected welding system. Example identification and/or capability information includes: an identifier of a paired welding-type power supply, an identification of capabilities of a paired welding-type power supply, software instructions to facilitate control of the welding-type power supply by the robot control system, identification of a welding capability of the welding-type power supply, identification of an adjustable parameter of the welding-type power supply, identification of a parameter limitation of the welding-type power supply, a robotic welding procedure and/or welding-type parameters to perform the robotic welding procedure, and/or any other information that may be transferred between the power supply 110 and the robot control system 112.

If identification and/or capability information has been received from the connected welding system (block 814), at block 816 the processor(s) 234 configure the operator interface (e.g., the interface screens 400, 420 of FIGS. 4A and 4B) based on the identification and/or capability information. For example, the processor(s) 234 may determine welding-related capabilities of the power supply 110 based on a look up of identification information, specific indications of capabilities and/or limitations, and/or other identification and/or capability information. Using the identification and/or capability information, the processor(s) 234 may present or omit certain capabilities and/or parameters, limit parameters, and/or otherwise enable and/or disable different features or options when presenting an interface enabling an operator to configure a robotic welding procedure. Additionally or alternatively, the processor(s) 234 may compare a configured robotic welding procedure against the capabilities and/or limitations determined based on the received identification and/or capability information, and output indication(s) of any identified conflicts between the procedure and the capabilities or limitations.

After configuring the operator interface (block 816), or if identification and/or capability information has not been received (block 814), at block 818 the processor(s) 234 determine whether a robotic welding procedure configuration has been received. For example, the processor(s) 234 may receive configurations and/or changes to a robotic welding procedure via an operator interface (e.g., the interface 420 of FIG. 4B) and the I/O devices 244.

If a robotic welding procedure configuration has been received (block 818), at block 820 the processor(s) 234 configure a robotic welding procedure. For example, the processor(s) 234 may store an updated robotic welding procedure based on the received configuration information and/or changes to a configuration in the memory 236 and/or in the storage device(s) 238.

After configuring the robotic welding procedure (block 820), or if configuration information has not been received (block 818), at block 822 the processor(s) 234 determine whether a selected robotic welding procedure is to be performed. For example, the operator may initiate one or more iterations of a selected robotic welding procedure via the operator interface and the I/O device(s) 244. If a selected robotic welding procedure is not to be performed (block 822), control returns to block 812 to continue monitoring the input power connection for data.

If a selected robotic welding procedure is to be performed (block 822), at block 824 the processor(s) 234 control the robotic manipulator 106 (e.g., via the I/O device(s) 244) and the welding equipment (e.g., via the communications circuitry 242) to perform the configured robotic welding procedure. Control then returns to block 822.

In some examples, the instructions 600 of FIG. 6 and the instructions 800 of FIG. 8 are performed in conjunction to establish a wireless communications channel, and automatically configure the welding equipment and/or the robot control system.

While examples are disclosed above with reference to a robot control system, collaborative robot and/or, more generally, robotic systems, in other examples the welding-type power supplies disclosed herein may communicate with other types of ancillary equipment via the auxiliary power connection. Example ancillary equipment may include power tools (e.g., grinders), induction heating power supplies, welding-type power supplies, filtration systems (e.g., personal respirator equipment, environmental filtration equipment), sensor systems, workpiece cleaning equipment (e.g., laser cleaning equipment), weld training equipment, and/or communications equipment.

When supported ancillary equipment (e.g., equipment capable of communicating via the input power line) is connected to the auxiliary power connection, the welding-type power supply and/or the connected equipment may communicate to establish parameters, establish a wireless communications channel, exchange identifying information, download and install software or firmware updates, communicate statuses, commands, and/or responses, and/or any other data exchange.

In some such examples, the ancillary equipment may communicate power requirements (e.g., peak current or power consumption) to the welding-type power supply to enable the power supply to manage the welding-type output and/or auxiliary output. For example, if the ancillary equipment has a peak power requirement that is sufficiently high, the power supply may disable use of the ancillary equipment (e.g., via communicating a disabling command and/or shutting off the auxiliary output) and/or may disable the welding-type output while the ancillary equipment is being used.

In some other examples, the welding-type power supply may communicate with a second power supply which is plugged into the auxiliary power connection of the first power supply. The second power supply may be a second welding-type power supply for electrode preheating or hot-wire processes, an induction heating power supply for workpiece induction heating, a power supply to enable tandem or other multi-wire processes, and/or any other type of power supply.

In some other examples, the welding-type power supply may interlock and/or control the output of welding-type power with the use or non-use of other equipment. As an example, if a personal or environmental filtration system is connected to the auxiliary power connection of the welding-type power supply, the power supply may activate the filtration in response to the initiation of welding (e.g., the trigger pull, start of gas flow, and/or initiation of the welding arc) and/or prevent arc initiation or other events until the filtration system communicates that the filtration is active.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power source with a program or other code that, when being loaded and executed, controls the welding power source such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   power conversion circuitry configured to convert input power to welding-type output power;
   auxiliary power output circuitry configured to output auxiliary power via an auxiliary power connection;
   communications circuitry configured to communicate via the auxiliary power connection; and
   a processor configured to:
      detect, via the communications circuitry, that a robot control system is coupled to the auxiliary power connection; and
      in response to detecting the robot control system:
         configure the welding-type power supply based on receiving a communication from the robot control system via the communications circuitry and the auxiliary power connection; and
         supply power from the auxiliary power output circuitry to the robot control system via the auxiliary power connection.

2. The welding-type power supply as defined in claim 1, wherein the processor is configured to, in response to detecting the robot control system, transmit an identification of capabilities of the welding-type power supply via the auxiliary power connection.

3. The welding-type power supply as defined in claim 1, wherein the processor is configured to, in response to detecting the robot control system, transmit an identifier of the welding-type power supply.

4. The welding-type power supply as defined in claim 1, wherein the processor is configured to, in response to detecting the robot control system, upload software instructions to the robot control system to facilitate control of the welding-type power supply by the robot control system.

5. The welding-type power supply as defined in claim 4, wherein the software instructions comprise at least one of a welding capability of the welding-type power supply, an adjustable parameter of the welding-type power supply, or a parameter limitation of the welding-type power supply.

6. The welding-type power supply as defined in claim 4, wherein the software instructions comprise a robotic welding procedure and welding-type parameters to perform the robotic welding procedure.

7. The welding-type power supply as defined in claim 6, wherein the robotic welding procedure comprises commands to move a robotic manipulator controlled by the robot control system.

8. The welding-type power supply as defined in claim 1, wherein the communications circuitry is configured to receive, from the robot control system, data associated with a facility in which at least one of the robot control system or the welding-type power supply is present.

9. The welding-type power supply as defined in claim 8, wherein the data associated with the facility comprises at least one of a physical mapping, an obstruction location, a location of a robotic manipulator coupled to the robot control system, or a power limitation of an electrical power supply.

10. The welding-type power supply as defined in claim 1, wherein the communications circuitry is configured to communicate via the auxiliary power connection via IEEE 1901 power line communication.

11. The welding-type power supply as defined in claim 1, wherein the processor is configured to control the power conversion circuitry to output the welding-type output power based on communications received via the communications circuitry.

12. The welding-type power supply as defined in claim 1, wherein the processor is configured to, in response to detecting the robot control system, at least one of prompt for a verification of the robot control system via a user interface or display an identifier associated with the robot control system via the user interface.

13. A welding-type power supply, comprising:

power conversion circuitry configured to convert input power to welding-type output power;

communications circuitry configured to communicate via wireless communications;

a user interface configured to initiate pairing of the communications circuitry with a robot control system; and a processor configured to, in response to initiation of pairing via the user interface:

control the communications circuitry to establish a wireless communications channel with the robot control system according to a pairing process; and in response to establishing the wireless communications channel, configuring the welding-type power supply based on receiving a communication from the robot control system via the communications circuitry.

14. The welding-type power supply as defined in claim 13, wherein the processor is configured to control the communications circuitry to establish the wireless communications channel based on an identifier associated with the robot control system and received via the user interface.

15. The welding-type power supply as defined in claim 13, wherein the user interface comprises an input device configured to initiate the pairing process.

16. The welding-type power supply as defined in claim 13, wherein the processor is configured to, in response to establishing the wireless communications channel, transmit an identification of capabilities of the welding-type power supply via the wireless communications channel.

17. The welding-type power supply as defined in claim 13, wherein the processor is configured to, in response to establishing the wireless communications channel, upload software instructions to the robot control system to facilitate control of the welding-type power supply by the robot control system.

18. The welding-type power supply as defined in claim 13, wherein the communications circuitry is configured to receive, from the robot control system, data associated with a facility in which at least one of the robot control system or the welding-type power supply is present.

19. The welding-type power supply as defined in claim 13, wherein the processor is configured to control the power conversion circuitry to output the welding-type output power based on communications received via the communications circuitry.

20. The welding-type power supply as defined in claim 13, wherein the wireless communications channel comprises at least one of a wireless local area network, a wireless personal area network, or a near field communications channel.

* * * * *